United States Patent
Xie (10) Patent No.: US 7,969,438 B2
(45) Date of Patent: Jun. 28, 2011

(54) SOFT SHADOWS FOR CINEMATIC LIGHTING FOR COMPUTER GRAPHICS

(75) Inventor: Feng Xie, Belmont, CA (US)

(73) Assignee: Pacific Data Images LLC, Redwood City, CA (US)

( * ) Notice: Subject to any disclaimer, the term of this patent is extended or adjusted under 35 U.S.C. 154(b) by 896 days.

(21) Appl. No.: 11/707,346

(22) Filed: Feb. 16, 2007

(65) Prior Publication Data

US 2008/0174600 A1 Jul. 24, 2008

Related U.S. Application Data

(60) Provisional application No. 60/897,227, filed on Jan. 23, 2007.

(51) Int. Cl.
*G06T 15/60* (2006.01)
(52) U.S. Cl. ...................................... 345/426
(58) Field of Classification Search ............ 345/955
See application file for complete search history.

(56) References Cited

U.S. PATENT DOCUMENTS

| | | | | |
|---|---|---|---|---|
| 6,018,350 A * | 1/2000 | Lee et al. | ...................... | 345/426 |
| 6,704,025 B1 * | 3/2004 | Bastos et al. | .................. | 345/589 |
| 6,744,433 B1 * | 6/2004 | Bastos et al. | .................. | 345/422 |
| 6,760,024 B1 * | 7/2004 | Lokovic et al. | ............... | 345/421 |
| 6,989,840 B1 * | 1/2006 | Everitt et al. | ................. | 345/592 |

OTHER PUBLICATIONS

Keating, B. et al. "Shadow Penumbras for Complex Objects by Depth Dependent Filtering of Multi-Layer Depth Images." In: Proceedings of the Eurographics 1999 Workshop (Jun. 21, 1999), pp. 197-212.*

Agrawala, M. et al. "Efficient image-based methods for rendering soft shadows." In: Proceedings of the 27th Annual Conference on Computer Graphics and Interactive Techniques (2000), pp. 375-384.*

Lischinski, D. et al. "Image based rendering for non-diffuse synthetic scenes." In: Proceedings of the Eurographics 1998 Rendering Workshop (1998), pp. 301-314.*

Im, Y. et al. "A Method to Generate Soft Shadows Using a Layered Depth Image and Warping." IEEE Transactions on Visualization and Computer Graphics (Mar. 21, 2005), vol. 11, No. 3, pp. 265-272.*

Chen, W. et al. "Real-Time Ray Casting Rendering of Volume Clipping in Medical Visualization." Journal of Computer Science and Technology (2003), vol. 18, No. 6, pp. 804-814.*

Keating, B. et al. "Shadow Penumbras for Complex Objects by Depth Dependent Filtering of Multi-Layer Depth Images." In: Proceedings of the Eurographics 1999 Workshop (Jun. 21, 1999), pp. 197-212.*

Im, Y. et al. "A Method to Generate Soft Shadows Using a Layered Depth Image and Warping." In: IEEE Transactions on Visualization and Computer Graphics (Mar. 21, 2005), vol. 11, No. 3, pp. 265-272.*

Lischinski, D. et al. "Image based rendering for non-diffuse synthetic scenes." In: Proceedings of the Eurographics 1998 Rendering Workshop (1998), pp. 301-314.*

(Continued)

*Primary Examiner* — Jason M Repko
(74) *Attorney, Agent, or Firm* — Morrison & Foerster LLP (57) ABSTRACT

A method and apparatus for high quality soft shadows for area lights in cinematic lighting for use in computer graphics, such as computer enabled animation. The method is an extension of traditional shadow maps, so the complexity of the present method is independent of geometric complexity. It uses multilayer translucent shadow maps, which can be used to produce high quality soft shadows for scenes with extremely complex geometry, fur, and volume objects. The present method computes the shadow factor by ray tracing the multilayer translucent shadow map.

15 Claims, 6 Drawing Sheets

OTHER PUBLICATIONS

Chen, W. et al. "Real-Time Ray Casting Rendering of Volume Clipping in Medical Visualization." Journal of Computer Science and Technology (2003), vol. 18, No. 6, pp. 804-814.*

Stamminger, M. et al. "Perspective Shadow Maps." In: Proceedings of the 29th Annual Conference on Computer Graphics and Interactive Techniques (2002), pp. 557-562.*

Extended European Search Report mailed on Nov. 26, 2009, for EP Patent Application No. 08250105.7, filed on Jan. 10, 2008, 7 pages.

Xie, F. et al. (2007). "Soft Shadows by Ray Tracing Multilayer Transparent Shadow Maps," *Eurographics Symposium on Rendering* pp. 1-12.

Agrawala, M. et al. (2000). "Efficient Image-Based Methods for Rendering Soft Shadows," *Proceedings of SIGGRAPH 2000, Computer Graphics Proceedings, Annual Conference Series* pp. 375-384.

Akenine-Möller, T. et al. (2002). "Approximate Soft Shadows on Arbitrary Surfaces Using Penumbra Wedges," *Eurographics Rendering Workshop 2002 Proceedings* pp. 297-306.

Anonymous. (Date Unknown). "Shadow Mapping," located at <http://en.wikipedia.org/w/index.php?title=Shadow_mapping&printable=yes>, last visited on Feb. 27, 2007, five pages.

Bavoil, L. et al. (Aug. 1, 2006). "Robust Soft Shadow Mapping with Depth Peeling," *Scientific Computing and Imaging Institute Technical Report UUSCI-2006-028*, pp. 1-10.

Cai, X.-H. et al. (2006). "Rendering Soft Shadows Using Multilayered Shadows Fins," *Computer Graphics Forum* 25(1):15-28.

Cook, R.L. et al. (Jul. 1984). "Distributed Ray Tracing," *Proceedings of SIGGRAPH 1984 Computer Graphics Proceedings, Annual Conference Series* 18(3):137-145.

Crow, F.C. (Summer 1977). "Shadows Algorithms for Computer Graphics," *Proceedings of SIGGRAH 1977, Computer Graphics Proceedings, Annual Conference Series* 11(2):242-248.

Drettakis, G. et al. (Jul. 24-29, 1994). "A Fast Shadow Algorithm for Area Light Sources Using Backprojection," *Proceedings of SIGGRAPH 1994, Computer Graphics Proceedings, Annual Conference Series*, Orlando, FL, Jul. 24-29, 1994, pp. 223-230.

Greene, N. et al. (Aug. 1-6, 1993). "Hierarchical Z-Buffer Visibility," *Proceedings of SIGGRAPH 1993, Computer Graphics Proceedings, Annual Conference Series, ACM*, Anaheim, CA, Aug. 1-6, 1993, pp. 231-240.

Hasenfratz, J.-M. et al. (Sep. 1-6, 2003). "A Survey of Real-Time Soft Shadow Algorithms," *Proceedings of the Eurographics 2003 STAR- (State of the Art Report) Workshop*, Granada, Spain, Sep. 1-6, 2003, 20 pages.

Kartch, D.A. (May 2000). "Efficient Rendering and Compression for Full-Parallax Computer-Generated Holographic Stereograms," A Dissertation Presented to the Faculty of Cornell University, 164 pages.

Keating, B. et al. (1999). "Shadow Penumbras for Complex Objects by Depth Dependent Filtering of Multi-Layer Depth Images," *Rendering Techniques '9, Proceedings of the Eurographics 1999 Workshop*, Granada, Spain, Jun. 21-23, 1999, pp. 197-212.

Landis, H. (Jul. 2002). "Production-Ready Global Illumination," Chapter 5 in *SIGGRAPH 2002 #16 RenderMan in Production Course Notes, Proceedings of the $29^{th}$ International Conference on Computer Graphics and Interactive Techniques*, San Antonio, TX, pp. 87-102.

Lischinski, D. et al. (1998). "Image-Based Rendering for Non-Diffuse Synthetic Scenes," *Eurographics Rendering Techniques Workshop 1998 Proceedings*, Vienna, Austria, Jun. 29-Jul. 18, 1998, 15 pages.

Lokovic, T. et al. (Aug. 2000). "Deep Shadow Maps," *Proceedings of SIGGRAPH 2000*, 8 pages, located at < http://graphics.stanford.edu/papers/deepshadows/deepshad.pdf>, last visited on Jan. 10, 2008, 8 pages.

Reeves, W.T. et al. (Jul. 1987). "Rendering Antialiased Shadows with Depth Maps," *Computer Graphics, Proceedings of SIGGRAPH '87 Conference*, Anaheim, CA, Jul. 27-31, 1987, 21(4):283-291.

Sander, P.V. et al. (2004). "Real-Time Skin Rendering on Graphics Hardware," International Conference on Computer Graphics and Interactive Techniques ACM SIGGRAPH Sketches p. 148.

Williams, L. (Jun. 1978). "Casting Curved Shadows on Curved Surfaces," *Computer Graphics* 12(1-2):270-274.

Woo, A. et al. (Nov. 1990). "A Survey of Shadow Algorithms," *IEEE Computer Graphics and Applications* 10(6):13-32.

Yee, Y.L.H. (Aug. 2000). "Spatiotemporal Sensitivity and Visual Attention for Efficient Rendering of Dynamic Environments," Master's Thesis, Cornell University, 102 pages.

Extended European Search Report mailed on Dec. 14, 2010, for EP Patent Application No. 10009993.6, filed on Jan. 10, 2008, 5 pages.

* cited by examiner

SOFT SHADOWS FOR CINEMATIC LIGHTING FOR COMPUTER GRAPHICS

FIELD OF THE INVENTION

This invention relates to computer graphics, and more specifically to depicting shadows.

BACKGROUND

Shadows play an important role in lighting and rendering; as Da Vinci said, 'an object appears most in relief when it is between light and shadow ', which is called penumbra. When the light source has an extended area, the shadow transitions gently from darkness to softness, and gives strong visual cues to the boundaries of the object. Physically correct soft edged shadows ("soft" shadows) are expensive to compute in computer graphics; for this reason, they are rarely used in production lighting in computer graphics such as animation. As a result, lighters doing computer aided animation spend much time manually tweaking lights to emulate the look of soft shadows.

There has been much work on shadow algorithms for computer graphics. There have been two main approaches to soft (soft edged) shadow computation. One set of solutions is object space based; several papers describe penumbra computation using wedges or blurred wedges. Most recently, there is known a soft shadow algorithm that uses a single ray and edge visibility computation to reconstruct the shadowed area. This algorithm is significantly faster than distributed ray tracing in many situations, but the visibility algorithm is still bound by geometric complexity, and the advantage over classic ray tracing degrades significantly as the number of edges in the scene increases. Since most production setups have very complex geometry such as depicting dense foliage and fur, geometric or object space methods are still not practical.

It is known that for single point light sources, a depth map generated from the light view may be used to compute the shadow factor of any point in the scene. The associated shadow maps may suffer from bias and abasing, but given high enough resolution and proper sampling and filtering, they can deliver an antialiased shadow look independent of geometric complexity. Recently there has been much work on hardware-assisted soft shadow computation. Most of that work focuses on real time performance (speed), whereas the goal of the present method is generating soft shadows of a quality similar to those of distributed ray tracing.

It is also known to use ray tracing layered depth images (LDI) for computing secondary rays in image based rendering; however, because the source of LDI is often range data captured from views other than those of the light sources, and this method was prone to light leaks.

It is also known to perform penumbra computation using quantized multilayer depth images (MDI); by sampling the quantized MDI using filtered deterministic ray marching (via correlation in the light samples among the shading surfaces). The combination reduces light leaks but also caused blockiness and banding in the shadow image. Also known is ray tracing of multi-view shadow maps for creating soft shadows from area lights; and deep shadow maps for generating high quality shadows for fur and volume (from small light sources).

SUMMARY

This disclosure shows that stochastic (versus deterministic) ray tracing of actual (versus quantized) multilayer depth maps generated from a light center view can achieve high quality soft shadows for area lights in scenes composed of complex geometry, and that the extension of storing opacity with depth in each layer sample allows production of high-quality soft shadows for area lights on fur and volume objects as well.

Instead of using depth maps generated from multiple views, the present method extends the traditional shadow map to store multiple depth layers, capturing most occluders for all the points on the area light with a single shadow map. In addition, by storing an opacity or translucency value along with a depth value in the separate layers, there is an enhancement of known deep shadow maps. Similar to deep shadows, the present shadow map supports detailed geometry such as fur and translucent volume objects; this data structure is called here a multilayer translucent shadow map or MTSM.

An MTSM may be sampled and filtered similar to a traditional depth map to create high quality shadows from small, point-like lights; more importantly, it can be ray traced to create high quality soft shadows for large area light sources for all types of objects.

By storing and probing all the depth layers at once, this method exploits the spatial coherence among objects projecting to the same screen pixel, significantly reducing the computational cost (in processor time, main memory, and disk storage) to ray trace shadow maps. Ray tracing multilayer shadow maps makes it possible to generate high quality shadows at a fraction of the cost of distributed ray tracing.

DETAILED DESCRIPTION

It is well known that in computer graphics given a single point light source l, a point p is in shadow if the ray from p to l is blocked by some geometry (object) in the scene. The shadow cast by a single point light source has a sharp silhouette: every point in the scene is either completely in shadow or out. For a single point light source l, a shadow map of appropriate resolution captures the visibility of geometry from the light source well and can be used to achieve a good quality shadow through percentage closer sampling and filtering.

For an area light source, a point p is totally in shadow if every part of the light source is blocked (umbra); it is not shadowed if every point of l is visible; otherwise it is partially in shadow if some portion of l is visible (penumbra). The shadow factor of p can be expressed in terms of the area of light blocked from p.

There are two known methods that compute the shadowed area of an extended light source correctly. One is image or shadow map based, which generates many sample shadow maps of the area light (around 1000 light samples), computes the shadow factor of point p for each shadow map, then averages the results. The other is stochastic ray tracing.

Both methods are very expensive (in computational time), resulting in many efforts to emulate the look of soft shadows using a single traditional depth map. The following is the conventional method of emulating soft shadows using a single depth map:

1. Transform point p to screen space of light l to get point p's screen space location sx,sy, then compute the light space p.z value of p.
2. Use p.z and min_z of the depth map to estimate the conservative filter size around location (sx, sy).

$$\text{filter\_size} = \text{resolution} * \text{light\_radius} * \left( \frac{1}{\min\_z} - \frac{t}{p \cdot z} \right) \quad (1)$$

3. Take stochastic samples within the filter region; a sample is a blocker if the z value is less than l.z; shadow factor is computed as the percentage blockers among the samples.

The filter size computed from equation (1) can be excessively large when min_z is very close to the light. Most variations of the method involve multiple passes that try to get a better estimate of the smallest blocker z in the filter region first in order to appropriately adjust the filter size. Main drawbacks of this method are darkened shadows due to wrong occlusion fusion, and gaps due to storage of only the occluder closest to the center of the light source (which often creates noticeable artifacts for contact shadows for large area lights).

The following briefly reviews computing soft shadows using stochastic ray tracing, as known in the field. The following is pseudo code (computer software-like instructions) for computing soft shadows using stochastic ray tracing:

```
float
    computeShadow(light, shadingPolygon, scene) {
        shadow = 0;
        for (i = 0; i < lightSampleCount; i++) {
            lightSample = getLightSample(light);
            surfSample = getsurfSample(polygon);
            ray = makeRay(lightSample, surfSample);
            if (intersect(ray, scene)) shadow += 1;
        }
        return shadow/lightSampleCount;
    }
```

Figure 1:
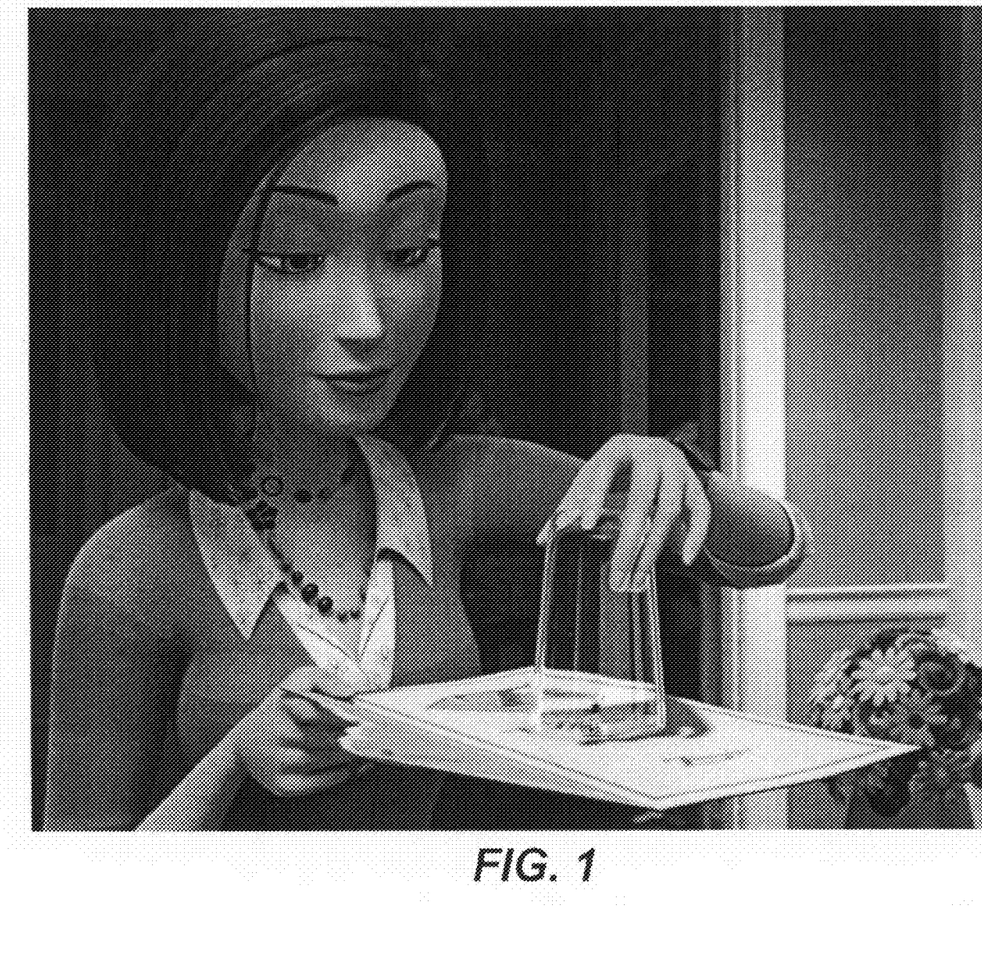
FIG. 1 shows an image with soft shadows generated using the present method.
Figure 2A:
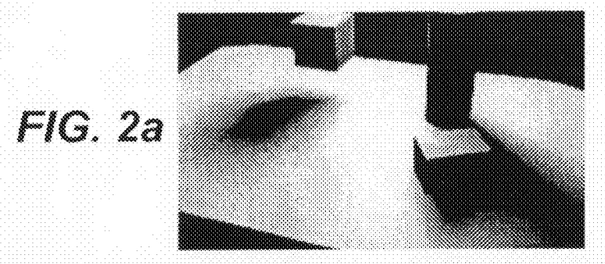
FIG. 2a shows an image with stochastic ray tracing.
Figure 2B:
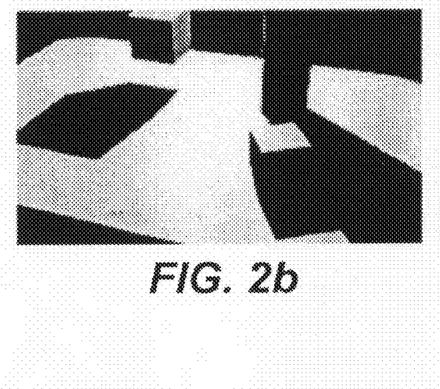
FIG. 2b shows the same image with shadow mapping, and FIG. 2c with depth map sampling with an area light source.
Figure 2C:
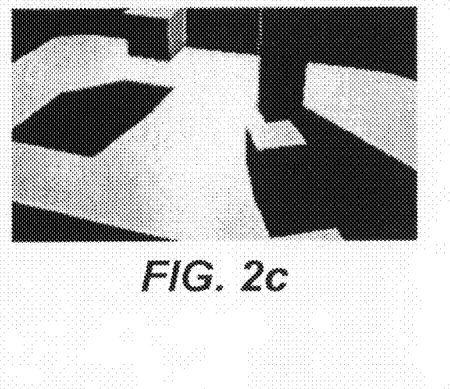

This is a simple and general algorithm for computing high quality soft shadows as shown in the image of FIG. 2a; the main drawback is the cost of computing the intersection of millions of rays with a complex scene. Far example, in the image of "Vanessa," in FIG. 1 there are 3.05 million shading surfaces, and 256 samples for each light, which implies the need to compute 256*3.05 million ray intersections against a scene composed of 105 million triangles. Even in a highly optimized ray tracer, this is prohibitively expensive for production lighting.

There has been much prior work in accelerating ray tracing against complex scenes using hierarchical traversal. The following uses a simplified representation of the scene to accelerate the computation of ray traced shadows for ray tracing depth maps for shadow computation.

Figure 3A:
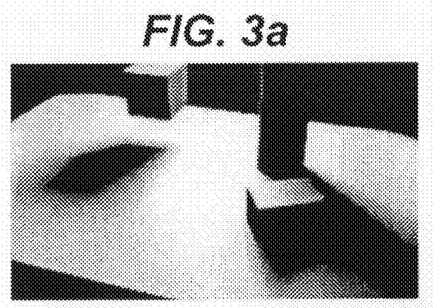
FIG. 3a shows a soft shadow image with MDI sampling.
Figure 3B:
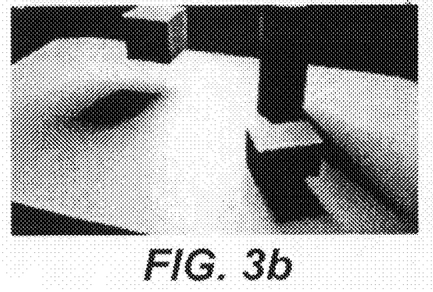
FIG. 3b shows the same image with ray tracing with a single layer depth map.
Figure 3C:
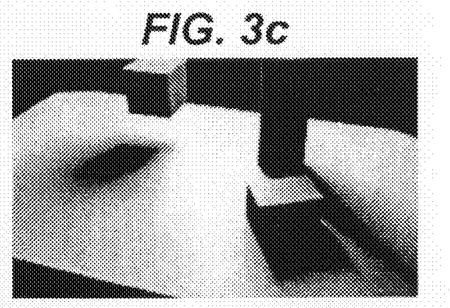
FIG. 3c shows the image with the present method.
Figure 3D:
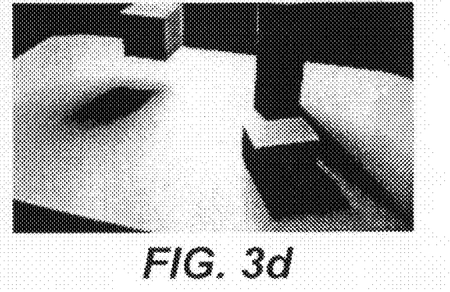
FIG. 3d with stochastic ray tracing.

FIG. 3b is an image of a simple test scene where the shadow computation is done by ray tracing the single depth map taken from the center of light. It does not suffer from darkened shadowing as in traditional sampling methods, but the light leaks are very noticeable, and they occur because the single depth map stores only the polygon closest to the light center through each pixel, so occluders for other parts of the light may be missing.

It is known to solve the light leak problem by adding multiple reference views to represent the scene. Those reference views are usually taken from the corners of the area light. The single depth map is then replaced with a list of depth maps, and each sample ray is tested against each view until an intersection is found. (In other words, if a ray hits any view, that ray is blocked and the other views on the list do not need to be tested.)

The main drawbacks of this algorithm are: 1. heuristic based view placement; 2. cost to setup and trace each view separately. To improve performance, it maintains a list of clipped screen rays and data structures to track ray coherence. These additions make the algorithm complicated to implement and introduce dependencies between the computation of individual rays.

To address these two issues, this disclosure introduces ray tracing multilayer shadow maps.

Mufti-layered depth maps store more than one depth sample per pixel. It is known to use a quantized version of the multilayer depth image method. This samples the quantized MDI using both a percentage closer filter and deterministic ray marching to compute the shadow factor. The combination of quantization and filtered deterministic ray marching causes banding and blockiness in the soft shadows generated.

More recently, others have used an actual multilayer depth image for soft shadow computation; they extended the above sampling and filtering algorithm to use an MDI to obtain a better estimation of occluder distance and filter size. FIG. 3a shows the effect of shadow computation by sampling and filtering an MDI; most of the light leaks are removed but the exaggeration of the umbra region remains (due to wrong occluder fusion).

Figure 7:
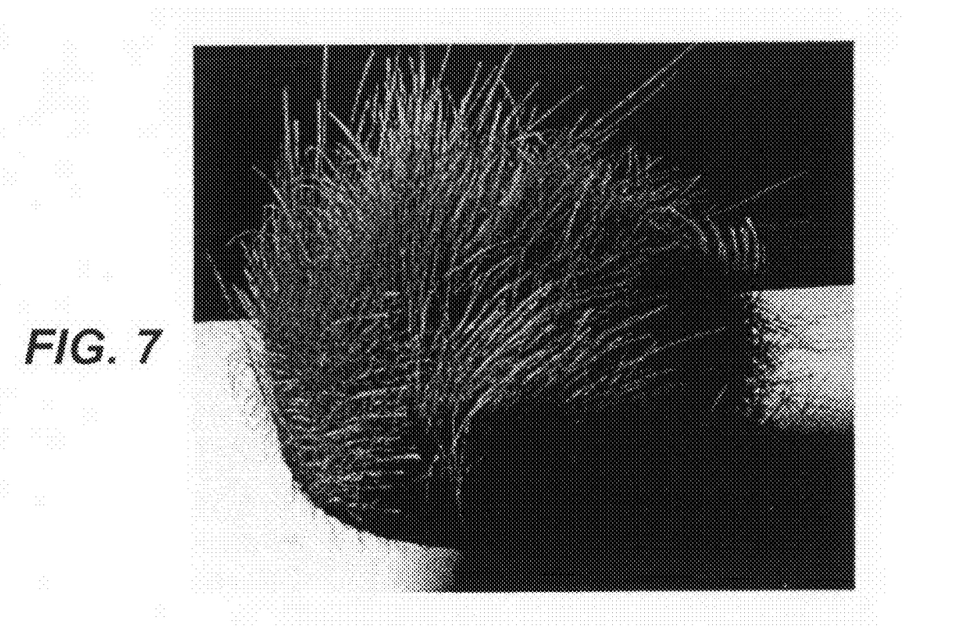
FIGS. 7-8 show a test image with the present method and stochastic ray tracing.

To construct a multilayer shadow map in accordance with this disclosure, one stores the first (k) layers of depth values in each pixel, see the image of FIG. 7. The algorithm uses a simple extension to the z buffer of a conventional scan line renderer. Instead of a single z value for each pixel, one maintains of list of k samples. As polygons are rasterized, if a z sample is closer than any of the existing k samples in a pixel, it is inserted into the list.

The extra computational cost incurred by constructing a k layer z buffer versus a single layer z buffer happens only when the incoming z sample needs to be inserted in the list of layers in the pixel. For a scan line renderer, the cost of x buffer rasterization is dominated by tessellation and scan conversion; the actual cost of updating the pixel z is small in comparison, and this is the only part one needs to modify to construct a multilayer z buffer. In the test scenes used here as explained below, construction computational cost of a four-layer shadow map is only on average 5 percent more than that for a single-layer shadow map.

In contrast, the computational cost of multi-view shadow maps is linear with respect to the number of views, so a four view shadow map will incur four times the cost of constructing a single view shadow map.

To ray trace a sample ray against a multilayer depth map, one performs the same operations as ray tracing a single depth map in terms of set up and scan converting the ray into the screen space of the shadow map. The following is pseudo code for computing soft shadows by ray tracing a multilayer shadow map:

```
float
computeShadow(light, point, MLSMAP) {
    shadow = 0;
    for (i = 0; i < lightSampleCount; i++) {
        lightPoint = takeLightSample(L);
        surfPoint = takeSurfSample(P);
        ray = makeRay (surfPoint, lightPoint);
        shadow += intersect(ray, MLSMAP);
    }
    return shadow/lightSampleCount;
}
```

Ray tracing depth images for image based rendering is known. That algorithm may be easily modified to work with a multilayer depth map. The intersection test of a shadow ray with a multilayer shadow map is done as follows:

First, one transforms the ray to the camera space of the shadow map, then clips this camera space ray using the minimum Z value of the shadow map, since it is assumed the light source is a flat area at the origin of the light space. (Its possible to extend this to support light sources that are not flat by using a conservative estimate of max z offsets of the area light in light space.) After this, one projects the clipped camera space ray to the screen space of the shadow map, and clips it using the viewports of the shadow map; now one has a screen space ray. One performs the intersection test by ray tracing the screen space ray against the shadow map.

Ray tracing a screen space ray against the multilayer shadow map is as follows. Given a screen space line that starts at location (sx, sy, sz) and ends at location (ex, cy, cz); one performs the regular scan line conversion, and as one walks through each pixel in the shadow map along the line, one computes z_enter and z_exit values of the ray across the pixel. Given (z_enter, z_exit), one scans the depth samples in the pixel (as opposed to the single z value in a traditional depth map); if a depth sample ($z_i$−e,$z_i$+e) overlaps (z_enter, z_exit), then an intersection is found; else the walk terminates at the end of screen space ray. e, the z error threshold, depends on the depth map resolution, and the angle between the surface normal and light direction; see below regarding this parameter. At the pixel level, the computational cost of finding a hit in a multilayer shadow map is o(log(k)) of the single layer shadow map, where k is the number of layers in the shadow map.

The computational cost to ray trace a shadow map is the same as the cost of scan converting a line, which is linear in the screen length of the line. The maximum screen length of sample rays for a light of radius r is determined as follows;

$$\text{screen\_length} = r * \text{resolution} * \left( \frac{1}{\text{min\_z}} - \frac{1}{\text{shading\_surface} \cdot z} \right) \quad (2)$$

For shadow maps of size of at least 1k×1k pixels, this value can be on the order of hundreds. Software scan conversion of a long line is quite expensive, but may be accelerated using hierarchical traversal. Given a multilayer depth map, one builds a quadtree to accelerate the ray tracing test. Each cell contains min_z and max_z of the four child cells in the layer below; hierarchical traversal of the scan converted ray enables quick rejection of large portions of the screen space ray. The following is pseudo code for hierarchical traversal of the quadtree given a screen space ray:

```
int trace(qNode, ray) {
    update ray.z_enter, ray.z_exit;
    if (no_overlap with ray) return 0;
    if (leaf(qNode))
        return intersect(qNode, ray)
    else for each nonempty child of qNode {
        if (trace(child, ray))
            return 1;
        return 0;
    }
}
```

Using a hierarchical z buffer, one reduces the cost of ray tracing shadow maps from linear to logarithmic in shadow map resolution and light radius.

Ray tracing multilayer depth maps work well for complex scenes with objects such as trees, foliage and surfaces; however, a depth map that stores only z values does not lend itself to translucent objects such as fur and fog where light is both absorbed and filtered within the object.

If for each pixel in the depth map, one shoots a ray from the center of the light to the center of the pixel (called here the light center ray), and stores the depth (position) and visibility change (opacity) of all the surfaces or volume samples the ray intersects along the way. Then one can use these samples to compute the visibility change of any light ray traveling through them. When the scene is composed of millions of hairs or translucent particles, storing all the samples each light center ray intersects is not feasible. It is known to use deep shadow maps, a compact representation of the visibility as a function of depth along each light ray; in accordance with this disclosure, one builds an MTSM by extending the known deep shadow construction algorithm.

For each light center ray, deep shadow mapping stores a compressed form of the visibility function. Each deep pixel stores a list of control vertices composed of depth and visibility, ($z_i$, $v_i$). The visibility of any depth along the light center ray may be computed using linear interpolation of the control vertices; however, to compute the visibility of another light ray traversing through the samples, one needs a way to estimate the visibility change (opacity) and location of the original samples.

The accumulated visibility change and depth range of the all the samples between two control vertices are known, so to reconstruct the average depth location and average visibility change of the original samples, all one needs is their total number. Then one computes the average visibility change (opacity) of each sample and the depth interval between them.

The structure of an MTSM pixel is: each pixel has a list of layers, and each layer contains ($z_i$, $v_i$ $count_i$), depth, accumulated visibility, and the count of the samples in between layer i−1 and layer i.

In addition, an MTSM pixel may need to store the depth and opacity of a subset of samples that are encountered after the visibility of the ray originated from light center through the pixel reaches zero, since those samples may contribute to the visibility reduction of a ray starting from a different point on the light source, (In the extreme case, an MTSM is a multilayer depth map, where each sample has full opacity, the need to store extra layers is clear here because they might be blockers of other points on the light sources; on the other hand, if the MTSM represents some homogeneous material such as a hair ball or cloud, there is little need to store layers after the visibility is reduced to 0; the ability to store layers after reaching full opacity enables MTSM to represent a more general mixture of shadow casters).

With two modifications, one can extend the known deep shadow construction algorithm to build an MTSM. First, one tracks and stores the count of original samples between the control vertices. Second, once the accumulated visibility of the compressed samples reaches zero, one resets the accumulated visibility to a value of 1 and compresses the subsequent samples the same way. One resets the accumulated visibility up to a user specified k times, so a MTSM pixel may have k layers as a deep shadow pixel.

Since MTSM in this way is an enhancement of deep shadow mapping, it may be sampled and filtered the same way to compute high quality shadows for fur and volume objects for small, point-like light sources. The following describes how to use MTSM to compute soft shadows from area light sources.

To compute soft shadows for semi-transparent (translucent) objects due to a large area light source, one modifies the multilayer depth map ray tracing algorithm to support a multilayer translucent shadow map. The main difference is that instead of a binary ray depth sample intersection test, one computes the accumulated visibility along each ray.

Pseudo code for hierarchical ray tracing reversible deep shadow map is as follows:

```
ray.vis = 1;
void trace(qNode, ray) {
    update ray.z_enter, ray.z_exit;
    if (no_overlap) return;
    if (leaf(qNode)) {
        intersect(qNode, ray);
    } else for each nonempty child of qNode {
        trace(child, ray);
        trace(child, ray);
        if (ray.vis < threshold) return;
    }
}
```

At the level, the ray intersection test is: First, perform an overlap test of the ray's [z_enter,z_exit] with a depth range of all the layers in the pixel, then find the two adjacent layers the ray is traveling through inside the pixel. If the ray's [z_enter, z_exit] overlaps either layer's z value, report an intersection. Otherwise, divide the z range between $(z_{i-1}, z_i)$ into $count_i$ buckets, and report a hit if the ray intersects with any bucket boundary, (each boundary represents the depth location of a sample between the two layers).

If the ray intersects layer i or any estimated sample between layer i−1 and layer i, reduce ray.vis by $dv_i$ where $$dv_i = (v_i - v_{i-1})/count_i; \tag{3}$$

Unlike ray tracing of multilayer opaque shadow maps, the ray scan does not stop after finding a first intersection; instead, each intersection reduces the visibility of the light ray, until it goes to zero or below a threshold; then the ray scan stops. The shadow factor of each ray is 1−accumulated_visibility. The shadow factor of the light the sum of the shadow factors of all the sample rays.

Most of time, shadows generated by ray tracing multilayer shadow maps look similar to shadows generated using stochastic ray tracing; however, the present method is subject to some inherent errors common to image based rendering. The following relates to these errors, and techniques to minimize them.

As the screen space ray crosses a pixel, one reports a positive hit if there exists a layer i where $[z_i-e, z_i+e]$ overlaps the $[z\_enter, z\_exit]$ of the screen space ray. This is a known method. Light leak is possible using this method. Quantization is known to reduce light leak, but this also causes significant change to the shadow casting geometry, and thereby adds error in the shadow computation. In contrast, there is the known "floor and wall" strategy to connect adjacent pixels whose z values are within a constant 'gap bias'. Both the "floor and wall" strategy and the simple constant "z threshold bias" strategy yield similar results in most test scenes. A constant "z threshold bias" is easier for animation artists to control. Intuitively, bigger "z threshold bias" means the umbra region might be slighter larger, while smaller 'z threshold bias' might mean the shadows looks lighter, and some light leaks might happen when the shadow caster is at an oblique angle with respect to the light direction.

More importantly, if a constant z bias is to be applied, it should be specified in camera space because screen space z is nonlinear. Since the ray walk is in screen space, one performs a perspective divide to compute the camera space z_enter and z_exit as the ray crosses a pixel. Fortunately, the perspective divide is not done for every screen pixel along the ray because the hierarchical z buffer eliminates most false regions, and the hierarchical z buffer is constructed using the screen space z values of the shadow map, so the perspective divide does not occur until the ray traversal reaches a leaf node of the quadtree.

Because this method relies on the shadow map to represent the shadow casting geometry in the scene, an object that is missing from the shadow map will not cast any shadow. An object in the scene may be missing from the shadow map for two reasons:

1. The object is clipped by the view frustum of the light. If some part of the shadow casting scene actually intersects or lies outside the viewing frustum of the light center, that part would be missing from the shadow map and therefore unable to contribute to shadow ray computation from the other points on the light. The view frustum clipping problem is simple to fix if it is known a priori the largest extent of the area light. If one pushes the light center back by this amount, $$d = light\_radius/tan(0.5*angle\ (fieldofview)) \tag{4}$$

then the view frustrum of the new light center will contain all the objects in view from any point on the light source using the same field of view.

2. The object is occluded by too many other objects. Given a light source with a large radius and a scene with high depth complexity, a multilayer shadow map of finite layer count such as four may not be able to capture some objects that could be casting shadows onto other objects visible from camera view. There is no easy solution to this problem. If an obvious light leak is happening due to a missing occluder, the artist can usually remedy the situation by increasing the number of layers in the shadow map. Generally, because of location coherence of the points on a single light source, the depth complexity of the scene visible from different points on the light source is low. (Recall that an object has to be visible from at least one point on the light source to be able to cast shadows.) In practice four layers suffice for most production setups.

The following tests were performed on a computer with an AMD Opteron processor with 2.2 Ghz speed and 4 gigabytes of memory. The above described algorithm was embodied in software executed on the computer and may be coded in any convenient computer language. The process was implemented as part of the lighting computation in an otherwise conventional deferred shading computer enable animation system, where only the visible micropolygons are shaded. The test scenes used posed a variety of challenges and demonstrate the scalability and robustness of the present soft shadow method.

Figure 4:
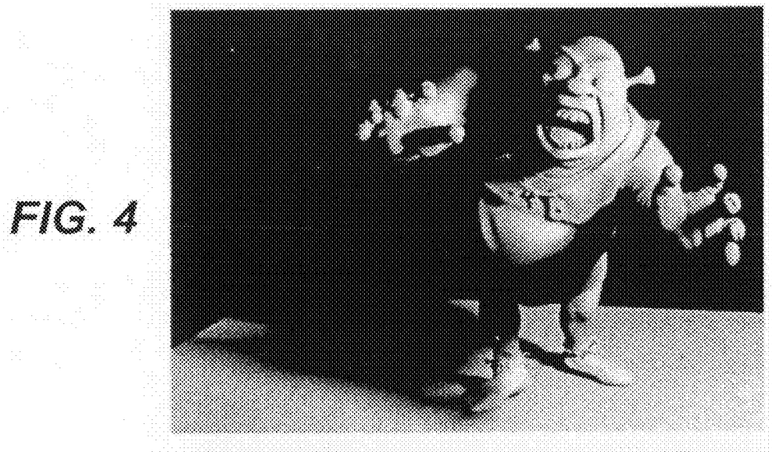
FIGS. 4-6 show a list image with respectively a single depth map sampling, the present method, and stochastic ray tracing.
Figure 5:
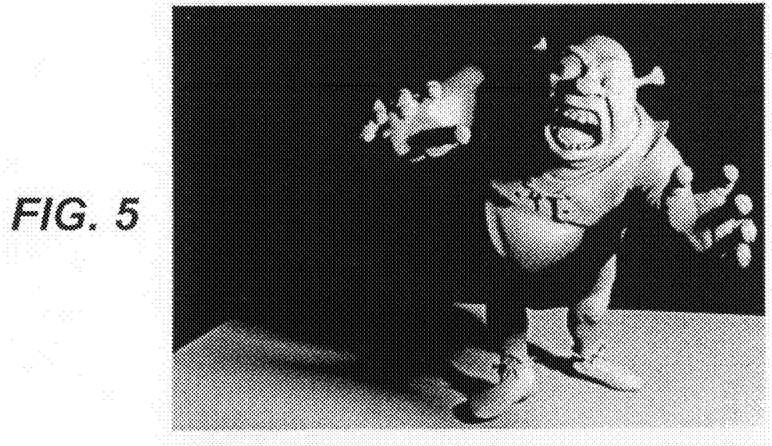
Figure 6:
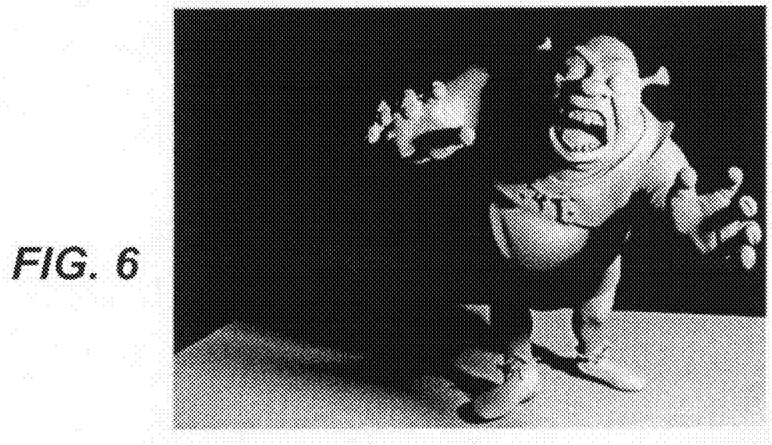
Figure 8:
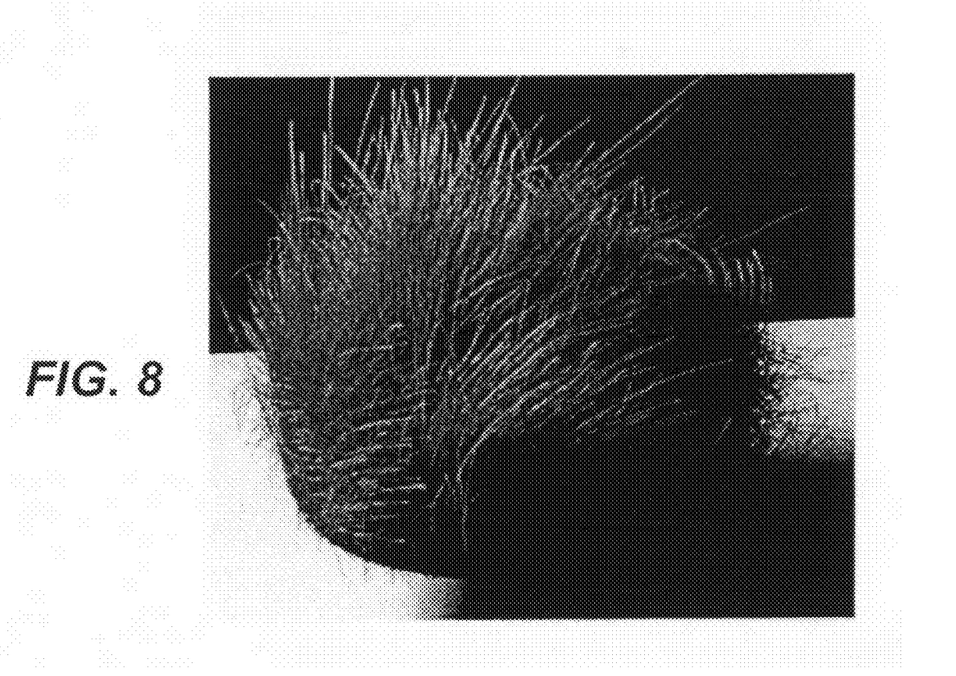
Figure 9:
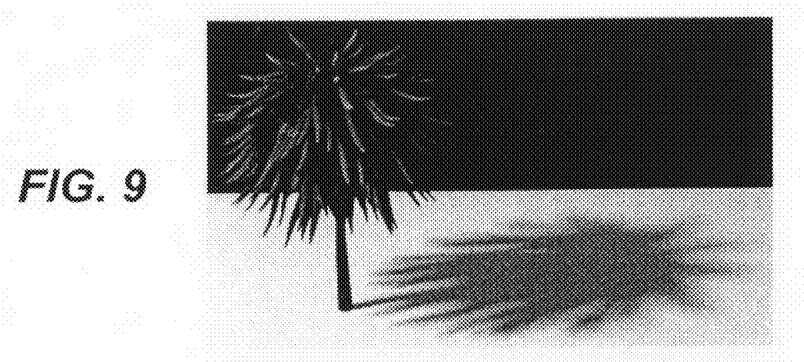
FIGS. 9-10 show a test image with the present method and stochastic ray tracing.
Figure 10:
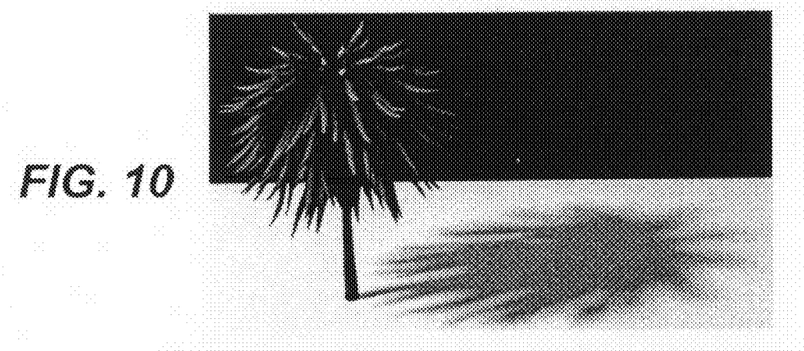

For the first three test cases, shrek (FIGS. 4-6), palm tree (FIGS. 9-10) and fur ball (FIGS. 7-8); the images were rendered at 600×300 pixel resolution. Each test case had one spot light source, and the resolution and maximum layer count of all three multilayer shadow maps were set at 1k×1k pixels and 5 respectively. (Note that these are still images, but the tests of course apply to animation also.)

In terms of quality, shadows generated using the present ray tracing MLSM method versus conventional stochastic ray tracing are almost identical in the shrek and palm tree tests. The fur ball test was challenging, due to the amount of self shadowing, yet even in this case the shadows generated by ray tracing MTSM appear quite similar to stochastic ray traced shadows.

In terms of computational cost, the benefit of ray tracing MLSM over stochastic ray tracing increases with geometric complexity. The cost benefit ranges from a factor of 5 to 17 (see Table 1). The cost of ray tracing MLSM between the three tests was fairly consistent, which validated that the cost of ray tracing shadow maps is bound by image complexity (see Table 2). In contrast, the cost to stochastic ray trace the fur ball is about 10 times the cost to ray trace shrek. Even though shrek has a higher polygon count than the palm tree, the palm tree has higher edge complexity, so it is more expensive to stochastic ray trace.

Figure 11:
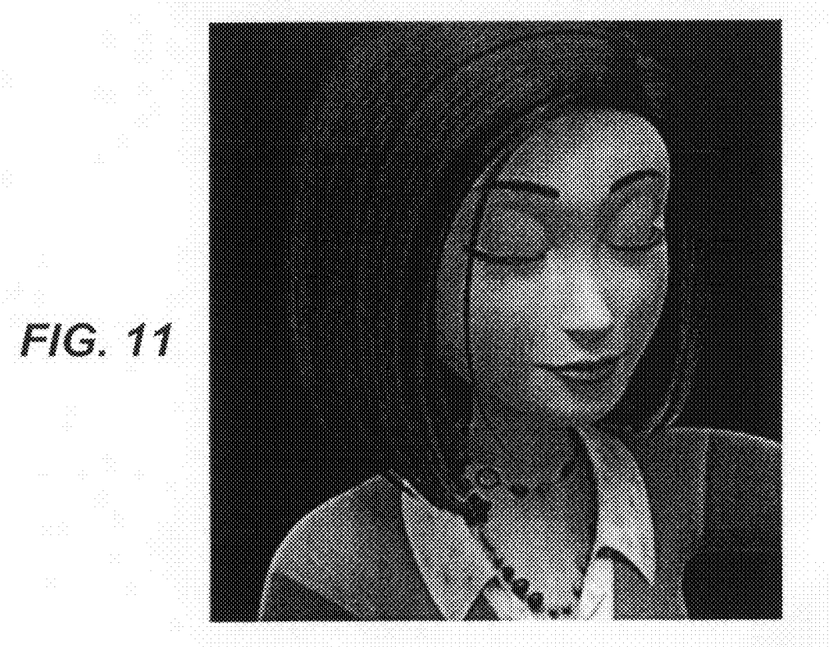
FIG. 11 shows detail of FIG. 1.

The final test case Vanessa (FIG. 11 showing detail of FIG. 1) had the most geometric and shading complexity. The character was lit with four large area lights to create the very soft shadow look. All four lights used 2k×2k pixel MTSM with a maximum of five layers. The image resolution was 2k×1k pixels (as in HDTV—high definition television). The performance of all four lights was consistent so only their average is reported here.

Figure 12:
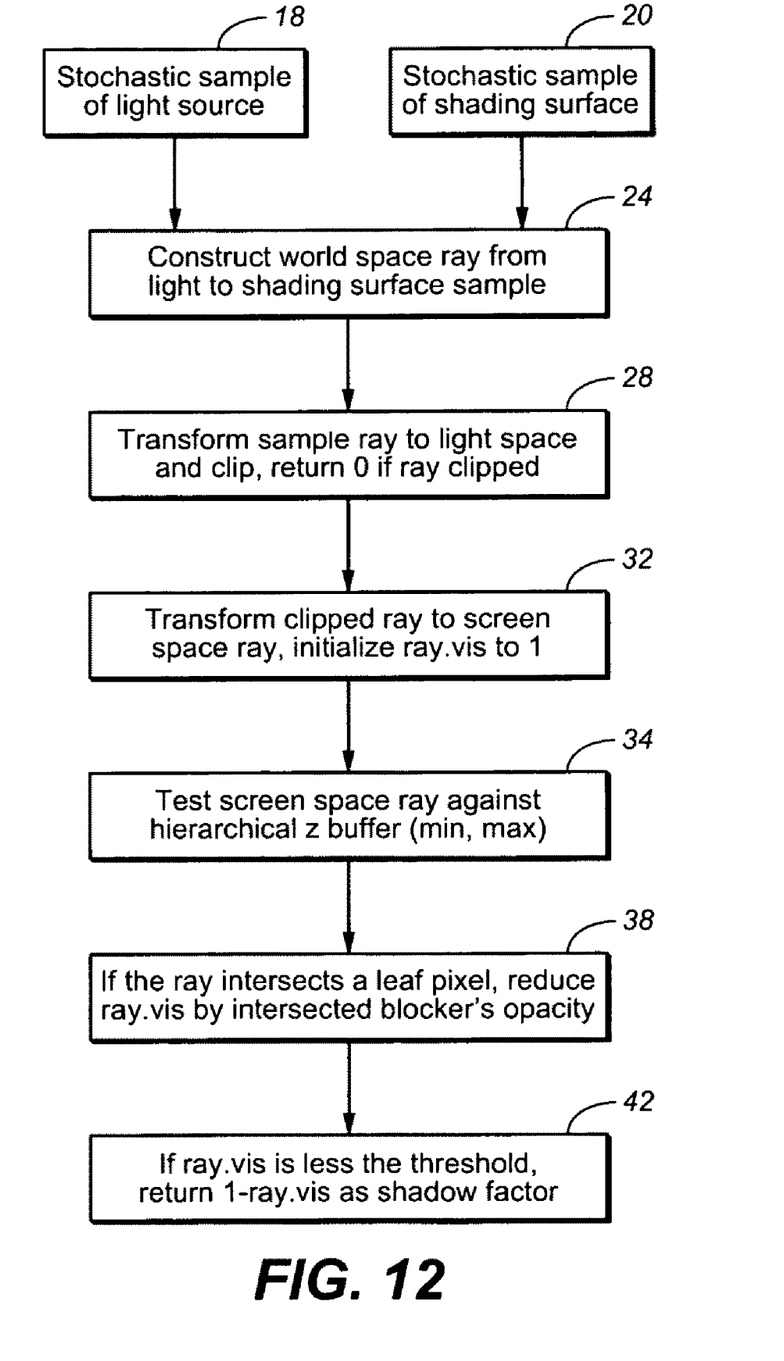
FIG. 12 shows a flowchart of the present method.

FIG. 12 shows in a flowchart the above described method for shadow factor computation for each sampled light ray using a hierarchical multi-lucent shadow map. This starts at 18 with the stochastic sample of the light source and at 20 with the stochastic sample of the shading surface. Then at 24 one constructs the world space light ray from the light (18) to shading surface sample (24). Next at 28 one transforms the sample ray to the light space, and clips the sample ray. The value of zero is returned if the ray is clipped. Then at 32 the clipped ray is transformed to the screen space light ray, and the value of ray.vis is initialized to 1.

Next at 34, one tests the screen space ray against the hierarchical z (depth) buffer minimum and maximum values. Then at 38 it is determined if the screen space ray intersects a leaf node pixel, then the value of ray.vis is reduced by the amount of opacity of the intersected pixel. Last, at 42, if the value of ray.vis is less than a threshold value, the value of (1-ray.vis) is returned as the shadow factor.

In terms of the cost to ray trace shadow maps (see Table 1), for the same number of light samples, the average per shadow query cost (computed as per frame shadow cost over shading sample count) was highest in the fur ball test, being about 50% more than the other tests. This is mainly because the fur ball's dense thin hair means longer ray traversal to accumulate full opacity in an MTSM. Even though the shadow map resolution doubled in the Vanessa test, the per shadow query cost is similar to the shrek test because the MTSM has a high density of opaque blockers and because the algorithm complexity is logarithmic in shadow map resolution.

TABLE 1

Per frame shadow computation time in seconds

|  | light sample # | ray tracing MSM | stochastic ray tracing |
|---|---|---|---|
| shrek | 64 | 15 | 55 |
|  | 128 | 30 | 108 |
|  | 256 | 57 | 207 |
| palm tree | 64 | 14 | 112 |
|  | 128 | 29 | 226 |
|  | 256 | 61 | 446 |
| fur ball | 64 | 35 | 623 |
|  | 128 | 72 | 1035 |
|  | 256 | 138 | 2107 |
| Vanessa | 256 | 556 | NA |

TABLE 2

Geometric and shading complexity

|  | shading sample # | shadow casting triangle # | shadow map res |
|---|---|---|---|
| shrek | 215k | 316k | 1k × 1k |
| palm tree | 263k | 165k | 1k × 1k |
| fur ball | 373k | 9124k | 1k × 1k |
| Vanessa | 3050k | 109M | 2k × 2k |

The present method is simple to implement as explained above and places no constraint on the light source shape or size. The complexity of the algorithm is logarithmic in shadow map resolution and independent of geometric complexity. It is easily parallelizable for computation purposes; once the shadow map is loaded into shared memory, all the shadow ray tests may be executed in parallel.

Compared to conventional ray tracing multi-view depth maps, the present method has two main advantages. First, multilayer shadow maps are easily extended to support semi-transparent objects; second, multilayer shadow maps scale better than multi-view depth maps in dealing with missing geometry, a fundamental problem in using depth maps to represent the scene; because adding a new layer has little impact on the cost of ray tracing a multilayer shadow map; while the cost of ray tracing multi-view depth map is linear in the number of views. Compared to soft shadows using traditional sampling of depth maps, the present method is about two to three times slower. The cost (slower speed) is justified given the high quality soft shadows produced, because it means less time spent by animation artists to create the look of physically correct soft shadows manually.

What is claimed:

1. A computer enabled method of animation, comprising the acts of:
   providing an image depicting at least one object;
   storing in a computer readable memory a plurality of depth values of each pixel of the image from a position of a light source, thereby forming a multilayer depth map;
   storing in the computer memory an opacity or translucency value along with each of the plurality of depth values of each pixel in the multilayer depth map, thereby forming a multilayer translucent shadow map;
   tracing a projected light ray against multilayer translucent shadow map;
   performing an intersection test of each traced light ray to define at least one shadow in the image, as cast by the light ray;
   wherein for each pixel there is provided a list of the layers of the multilayer depth map, each layer having a depth of the first samples in the layer, an accumulated opacity of all the samples in the layer, and a count of samples in the layer;

wherein the intersection test includes computing in a processor an accumulated visibility along each of the traced light rays using the multilayer translucent shadow map.

2. The method of claim 1, further comprising the acts of sampling and filtering the shadow map thereby to compute a shadow effect of the light source.

3. The method of claim 1, wherein the act of storing comprises:

providing a scan line renderer; and in the scan line renderer, providing a list of a plurality of samples for each pixel representing the depth values of all objects that cover that pixel.

4. The method of claim 3, further comprising the act of inserting a sample into the pixel list of the shadow map when an object covering that pixel is rasterized.

5. The method of claim 1, wherein the act of performing the intersection test further comprises:

transforming the light ray to a ray in camera space of the shadow map;

clipping the camera space ray;

projecting the clipped camera space ray to a screen space of the image; and ray tracing the resulting screen space ray against the multilayer translucent shadow map.

6. The method of claim 1, further comprising the acts of: projecting a light ray to each pixel of the image;

determining a position of surfaces or volume samples intersected by the projected light ray for each pixel; and determining visibility changes of the projected light ray due to the intersection.

7. The method of claim 1, further comprising the acts of: storing a number of samples between each pair of the selected points; and when the accumulated opacity is 1, resetting it to a value of zero.

8. The method of claim 1, wherein the projected light rays emanate from an area light source.

9. The method of claim 1, further comprising the act of: moving a camera location of the shadow map away from a center of the light source, along a reverse direction of the light; whereby the objects in the image are not clipped by the projected light ray.

10. The method of claim 1, further comprising the act of: providing at least four of the layers.

11. A non-transitory computer readable medium storing computer code for carrying out the method of claim 1.

12. A programmed computer, programmed to carry out the method of claim 1.

13. The method of claim 1, further comprising the acts of: for each pixel on the projected light ray:

determining the opacity of points intersected by the projected light ray at the pixel, wherein the opacity of a point between any two of the pixels is computed using an interpolation of values of the stored depth and opacity layers;

reducing the accumulated visibility of light ray by the opacity of the intersected point; and stopping the reducing when an accumulated visibility of the light ray is zero.

14. The method of claim 1, wherein the light source is stochastically sampled to generate a plurality of light positions; and a plurality of light rays are computed as originating from these sampled light positions; and the shadow factor of the area light source is computed by aggregating the shadow factors of the plurality of light rays.

15. A computer enabled method for generating soft shadows in an image of an object for an area light source, comprising the acts of:

generating a shadow map depicting at least the object;

storing in a computer readable memory multiple layers of depth and opacity values for each pixel in the generated shadow map while rendering the object lit with the area light source;

computing in a computer processor a projected ray for each of a plurality of stochastically sampled light positions on the area light source;

tracing the projected ray through the layers of the shadow map;

accumulating visibility along the traced ray as a function of the stored depth and opacity values in each pixel of the shadow map that the ray overlaps;

computing in the computer processor a shadow factor of each traced ray as 1 minus the accumulated visibility of that ray;

wherein for each pixel there is provided a list of the layers of the multilayer depth map, each layer having a depth of the first samples in the layer, an accumulated opacity of all the samples in the layer, and a count of samples in the layer; and computing in the computer processor a shadow factor of the area light source as the weighted average of the computed shadow factors of the plurality of the sampled light rays.

* * * * *

UNITED STATES PATENT AND TRADEMARK OFFICE
CERTIFICATE OF CORRECTION

| | | |
|---|---|---|
| PATENT NO. | : 7,969,438 B2 | Page 1 of 1 |
| APPLICATION NO. | : 11/707346 | |
| DATED | : June 28, 2011 | |
| INVENTOR(S) | : Xie | |

It is certified that error appears in the above-identified patent and that said Letters Patent is hereby corrected as shown below:

In column 3, line 56, delete "Far" and insert -- For --

In column 8, line 43, delete "frustrum" and insert -- frustum --

Signed and Sealed this
Twenty-seventh Day of September, 2011

David J. Kappos
*Director of the United States Patent and Trademark Office*